United States Patent [19]

Inaba et al.

[11] Patent Number: 5,804,224
[45] Date of Patent: Sep. 8, 1998

[54] DRIVING APPARATUS FOR ELECTRICALLY-OPERATED INJECTION MOLDING MACHINE

[75] Inventors: Yoshiharu Inaba, Kawasaki; Yasushi Ishikawa, Yamanashi; Susumu Ito, Yamanashi; Koichi Nishimura, Yamanashi, all of Japan

[73] Assignee: Fanuc Ltd, Yamanashi, Japan

[21] Appl. No.: 580,250

[22] Filed: Dec. 28, 1995

[30] Foreign Application Priority Data

Dec. 28, 1994 [JP] Japan .................................. 6-337701

[51] Int. Cl.⁶ ........................................ B29C 45/66
[52] U.S. Cl. ................... 425/150; 425/574; 425/592; 425/593
[58] Field of Search ........................ 425/145, 171, 425/567, 569, 556, 590, 589, 150, 574, 592, 593

[56] References Cited

U.S. PATENT DOCUMENTS

| | | |
|---|---|---|
| 4,676,730 | 6/1987 | Yamasaki ............................... 425/569 |
| 4,741,685 | 5/1988 | Inaba et al. . |
| 4,895,505 | 1/1990 | Inaba et al. ............................ 425/145 |
| 4,950,144 | 8/1990 | Watanabe et al. ..................... 425/171 |
| 5,129,808 | 7/1992 | Watanabe et al. ..................... 425/145 |
| 5,147,659 | 9/1992 | Watanabe et al. ..................... 425/145 |
| 5,279,778 | 1/1994 | Taira et al. ............................ 425/150 |

FOREIGN PATENT DOCUMENTS

| | | |
|---|---|---|
| 60-129230 | 7/1985 | Japan . |
| 60-132721 | 7/1985 | Japan . |
| 62-128724 | 6/1987 | Japan . |
| 62-160219 | 7/1987 | Japan . |
| 3-278930 | 12/1991 | Japan . |
| 405309707A | 11/1993 | Japan .................................... 425/589 |

*Primary Examiner*—Jay H. Woo
*Assistant Examiner*—Minh-Chau T. Pham
*Attorney, Agent, or Firm*—Staas & Halsey

[57] ABSTRACT

A driving apparatus for an electrically-operated injection molding machine not requiring any bearing nor any connector. An electric motor having a rotor shaft on which a ball screw is integrally formed is mounted on one of a cross-head and a rear platen of a clamping mechanism, while a ball nut threadedly engaged with the rotor shaft is fixed to the other of the cross-head and the rear platen to constitute the driving apparatus for linearly moving the cross-head. As the ball screw is integrally formed on rotor shaft, any connector for connecting these two members is unnecessary. As the ball screw is directly rotated by the motor positioned coaxially with the ball screw, any bearing for bearing a redial force acting on the ball screw and rotor shaft. The apparatus may also be applied to an ejection mechanism, an injection mechanism and a nozzle touch mechanism of the electrically-operated injection molding machine.

9 Claims, 4 Drawing Sheets

DRIVING APPARATUS FOR ELECTRICALLY-OPERATED INJECTION MOLDING MACHINE

BACKGROUND OF THE INVENTION

1. Field of the Invention

The present invention relates to an improvement of a driving apparatus for driving a movable member relative to a stationary member in an electrically-operated injection molding machine.

2. Description of the Related Art

There is known an electrically-operated injection molding machine in which a movable platen of a clamping mechanism, an ejector rod of an ejection mechanism, an injection screw of an injection mechanism, an extruder base of a nozzle touch mechanism, and any other movable member is linearly moved by means of an electric motor and a ball screw/ball nut mechanism.

A ball nut is fixed to a cross-head of the conventional toggle-type clamping mechanism and is linearly moved by rotation of a ball screw which is rotatably but axially immovably supported by a rear platen, along an axis of the ball screw, so that a clamping action by the movable platen is performed to operate the individual links of the toggle mechanism. The apparatus for rotating the ball screw comprises a pulley fixed to one end of the ball screw, an electric motor mounted on a side of the rear platen, a pulley fixed to a rotor shaft of the electric motor and a timing belt wound around the pulleys. In order to rotatably and axially immovably support the ball screw on the rear platen against both a radial force exerted on the pulley by the timing belt and a clamping force exerted on the ball screw, it is inevitable to provide an angular bearing or the like between the ball screw and the rear platen to bear the radial and axial forces, which results in a complex structure.

With the above structure, since the ball screw is driven through the pulleys and the timing belt, backlashes tend to accumulate to deteriorate the positioning accuracy. The existence of these power transmitting elements increases an inertia of the power transmission system to lower the moving responsiveness. Locating the electric motor at one side of the rear platen would increase the whole injection molding machine in width and height. The same problems would be encountered also with the ejection mechanism, the injection mechanism and the nozzle touch mechanism.

A solution for the foregoing problems is proposed in Japanese Patent Laid-Open Publications Nos. Showa 62-160219 and Showa 62-128724. In the apparatus disclosed in the above publications the ball screw is directly driven by the electric motor without using pulleys and a timing belt. However, the prior art could not eliminate the necessity of providing a supporting element (bearing) for supporting the ball screw and a connecting element (joint) for connecting the ball screw and the electric motor, so that a requirement of simplification of structure is not adequately met.

Further, Japanese Patent Laid-Open Publications Nos. Showa 60-129230, 60-132721 and Heisei 3-278930 propose an electrically-operated injection molding machine in which a ball nut is formed in a rotor of the electric motor and a ball screw inserted into the rotor is directly driven by the ball nut to linearly move an injection screw integrally formed with the ball screw. As the ball nut is fitted in the rotor, a diameter of the electric motor inevitably increases and as the moment of inertia of the rotor and the ball nut are large, it is difficult to obtain a good responsiveness of movement.

SUMMARY OF THE INVENTION

An object of the present invention is to provide a driving apparatus for driving a movable member of an electrically-operated injection molding machine, which has a simple and compact structure requiring no bearing or connector, accumulates less backlash and has a small inertia in a power transmission system.

According to the present invention, there is proved a driving apparatus for driving a movable member relative to a stationary member of an electrically-operated injection machine, comprising: an electric motor having a rotor shaft and mounted on one of the movable member and the stationary member; a ball screw formed integrally with the rotor shaft of the electric motor; and a ball nut threadedly engaged with the ball screw and non-rotatably fixed to the other of the movable member and the stationary member.

The ball screw integrally formed with the rotor shaft is directly driven by the rotor arranged coaxially with the ball screw. Therefore, no radial force is exerted on the ball screw and thus a bearing for bearing a radial force on the ball screw is made unnecessary. As the electric motor for driving the ball screw is arranged always on an axis of the ball screw, neither width nor height of the injection molding machine increases by the electric motor. Further, as the ball screw is directly driven by the electric motor without using any power transmission elements such as a pulley and a timing belt, no backlash accumulates. Because of less number of parts in the power transmission system, an inertia of the power transmission system is made small.

As the ball screw is integrally formed with the rotor shaft of the electric motor, a connector or a joint is unnecessary for connecting the rotor shaft of the motor with the ball screw. Further, as the ball screw is driven to forward the ball nut, the moment of inertia is made smaller than the arrangement in which the ball nut is driven.

DETAILED DESCRIPTION OF THE PREFERRED EMBODIMENTS

Figure 1:
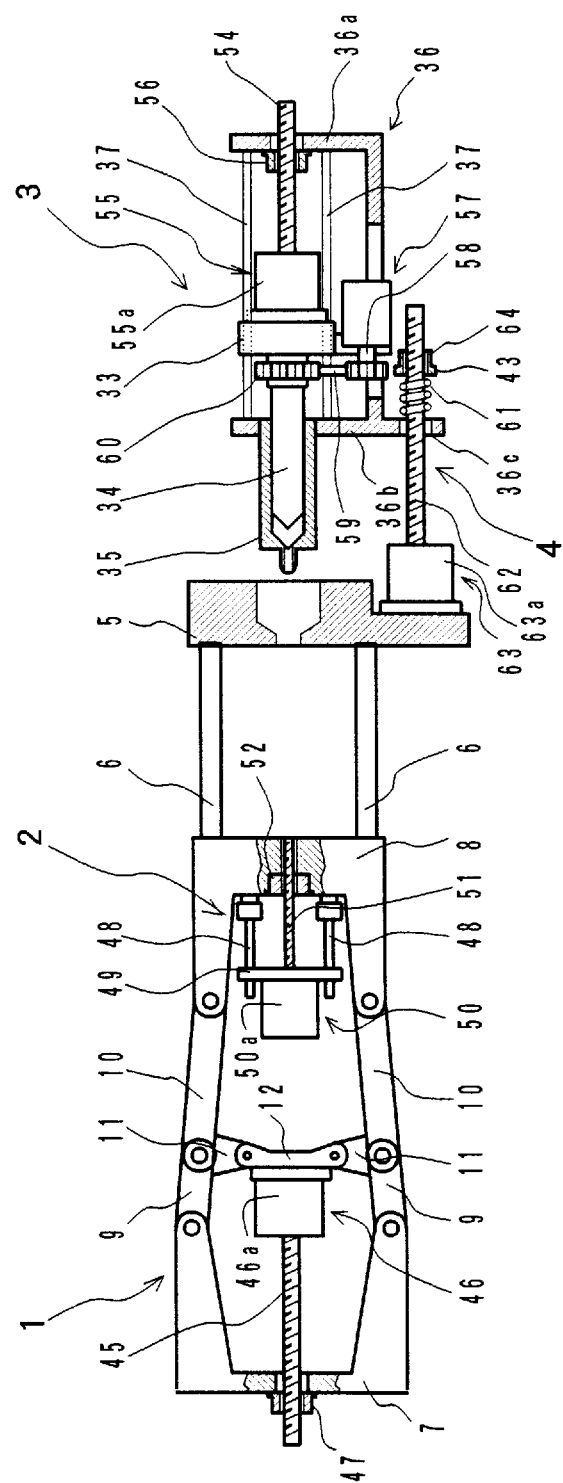
FIG. 1 is a side view of an electrically-operated injection molding machine having driving apparatus according to the present invention.

An electrically-operated injection molding machine shown in FIG. 1 comprises a clamping mechanism 1, an ejection mechanism 2, an injection mechanism 3 and a nozzle touch mechanism 4.

The clamping mechanism 1 is of a four-point toggle type and composed of a stationary platen 5 fixed to a base of the injection molding machine, a rear platen 7 connected to the stationary platen 5 via tie bars 6, a movable platen 8 slidably supported on the tie bars 6, a ternary link 9 having one end pivotally connected to a staple of the rear platen 7, a binary link 10 having one end pivotally connected to the other end of the ternary link 9 and the other end pivotally connected to a stable of the movable platen 8, a cross-head 12, and a cross-head link 11 pivotally connected between the cross-head 12 and the pivot point of the ternary link 9 and the binary link 10.

An electric motor 46 is attached to a back surface of the cross-head 12 as a movable member and a ball screw is integrally formed on a rotor shaft 45 of the electric motor 46. A ball nut 47 is non-rotatably and axially immovably fixed to an approximately central portion of the rear platen 7 as a stationary member, and is threadedly engaged with the ball screw of the rotor shaft 45. Two thrust bearings may be mounted on both sides of a rotor between a motor casing 46a and a rotor shaft 45 for bearing axial forces. However, only one thrust bearing may be mounted on one side of the rotor to bear a force acting in such a direction that the rotor shaft 45 pushes the casing 46a, while the other thrust bearing may be omitted for bearing a force acting in such a direction that the rotor shaft 45 pulls the casing 46a, because a clamping reaction force acts in the direction that the rotor shaft 45 pushes the motor casing 46a. Of course, it is necessary to provide a bearing having a centering function on the other side of the rotor.

By driving the electric motor 46 to rotate the ball screw of the rotor shaft 45, the engaging portion of the ball screw with the ball nut 47 varies axially so that the electric motor 46 and the cross-head 12 as a unit move axially along the rotor shaft 45 to actuate the individual links 11, 9 and 10 for a clamping motion and an unclamping motion by the movable platen 8.

At that time, since no radial force acts on the ball screw of the rotor shaft 45, a radial bearing for bearing the radial force exerted on the rotor shaft 45 is unnecessary, unlike the conventional driving mechanism composed of pulleys fixed to the rotor shaft and the ball screw and a timing belt wound around the pulleys. Further, since the electric motor 46 itself has a function of a thrust bearing, it is unnecessary to provide a separate thrust bearing for bearing the clamping reaction force. As the electric motor 46 is directly attached to the cross-head 12 positioned between the tie bars 6, both width and height of the injection molding machine are reduced as compared with the arrangement in which the electric motor is mounted on the rear platen 7. Further, since the ball screw of the rotor shaft 45 is directly rotated by the electric motor 46, no backlash accumulates on a power transmitting path, so that an excellent accuracy of positioning of the cross-head 12 can be obtained by a semi-closed loop control performed by detecting the position of the electric motor 46 as a servo motor.

Figure 2:
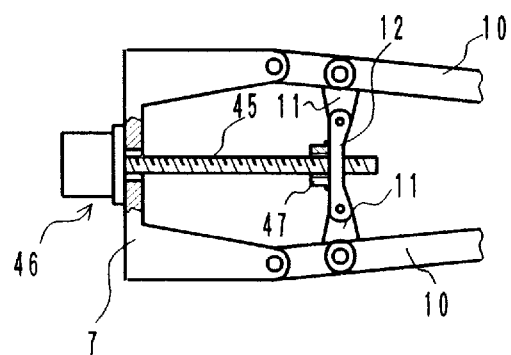
FIG. 2 shows another embodiment of the driving apparatus for a clamping mechanism according the invention.

Alternatively, as shown in FIG. 2, the electric motor 46 may be mounted on the rear platen 7 serving as a stationary member, while the ball nut 47 may be fixed to the cross-head 12 serving as a movable member. With this arrangement, the same effects as mentioned above can be obtained. Further, in the arrangement of FIG. 2, since the electric motor 46 does not move with the cross-head 12, it is advantageous that the inertial load is made small. FIG. 2 shows an example in which the electric motor 46 is mounted on a back surface of the rear platen 7. Alternatively, the electric motor 46 may be mounted on a front surface of the rear platen 7 so that the entire length of the injection molding machine does not increase.

The ejection mechanism 2 includes, as shown in FIG. 1, a pair of guide rods 48 fixed to a back surface of the movable platen 8, a knockout bar 49 slidably attached to the guide rods 48, an electric motor 50 mounted on the knockout bar 49, and a ball nut 52 fixed to an approximately central portion of the movable platen 8 and threadedly engaged with a ball screw which is integrally formed with a rotor shaft 51 of the electric motor 50.

When the electric motor 50 is driven to rotate the ball screw of the rotor shaft 51, the engaging portion of the ball screw with the ball nut 52 varies axially to axially move the electric motor 50 and the knockout bar 49 as a unit along the guide rods 48, so that the distal end of the rotor shaft 51, which functions as an ejector rod, projects and retracts from the front surface of the movable platen 8 to eject a molded product and to return to its home position.

In general, the distal end of the rotor shaft 51 serving as an ejector rod moves an ejector plate (not shown) of the movable mold against the elastic force of a return spring of the movable mold to eject a molded product. Only a part of the rotor shaft 51 positioned between the ball nut 52 and the ejector plate bears an axial reaction force of the return spring, so that axial force is not applied to the rotor of the electric motor 50. Therefore, no great force acts between the rotor shaft 51 and a motor casing 50a so that it is unnecessary to provide the electric motor 50 with any thrust bearing for bearing axial forces. Of course, it is necessary to provide a bearing having a centering function.

Figure 3:
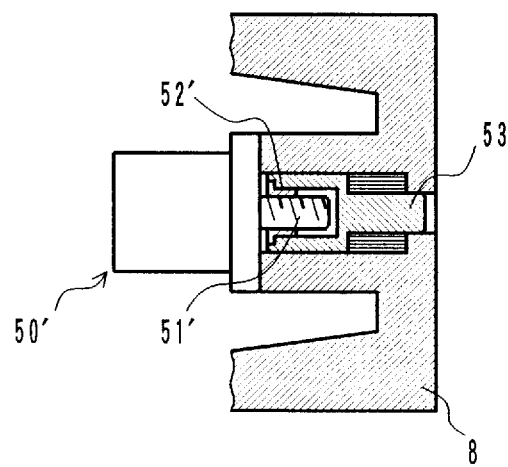
FIG. 3 shows another embodiment of the driving apparatus for an ejection mechanism according the invention.

In another arrangement, as shown in FIG. 3, an ejector rod 53 fixed to a ball nut 52' is slidably fitted by a spline to a hole formed in the movable platen 8, and a ball screw integrally formed with a rotor shaft 51' of the electric motor 50', which is fixed to a back surface of the movable platen 8, is threadedly engaged with the ball nut 52' so that the ejector rod 53 projects from a front surface of the movable platen 8. With this arrangement, when the electric motor 50' is driven, the engaging position of the ball screw of the rotor shaft 51' with the ball nut 52' varies axially so that the ejector rod 53, whose rotation is inhibited by the spline fitting with respect to the movable platen 8, projects and retracts from the front surface of the movable platen 8. In the embodiment of FIG. 3, since a reaction force of the return spring of the movable mold directly acts on the rotor of the electric motor 50' via the ejector rod 53, the ball nut 52' and the rotor shaft 51', it is preferable to provide a thrust bearing between the left end surface of the rotor and an inner surface of the left end of the motor casing. In this arrangement, the ejector rod 53, to which the ball nut 52' is attached, serves as a movable member, while the movable platen 8, on which the electric motor 50' is mounted, serves as a stationary member.

The ejection mechanism 2 using the electric motor 50 having the rotor shaft 51 on which the ball screw is integrally formed, also has effects of omitting the radial bearings, compacting the whole mechanism and eliminating backlashes like the clamping mechanism 1.

To a back surface of the screw pressure plate 33 of the injection mechanism 3, an electric motor 55 having a rotor shaft 54 on which a ball screw is integrally formed is fixed. Likewise in the aforesaid clamping mechanism, since an injection reaction force acts in such a direction that the rotor shaft 54 pushes a motor casing 55a, a thrust bearing for bearing a force acting in such a direction that the rotor shaft 54 pulls the motor casing 55a may be omitted or reduced in size. A ball nut 56 is fixed to an approximately central portion of a rear plate 36a of an extruder base 36, which acts as a stationary member, and is threadedly engaged with the ball screw of the rotor shaft 54.

When the electric motor 55 is driven to rotate the ball screw of the rotor shaft 54, the engaging portion of the ball screw with the ball nut 56 varies axially so that the motor 55 and the screw pressure plate 33 as a unit axially move along tie rods 37. In response to the axial movement of the screw pressure plate 33, an injection screw 34 rotatably but axially immovably mounted on the screw pressure plate 33 is moved in a cylinder 35 which is integrally mounted on a front plate 36b of an extruder base 36, to perform injection.

An electric motor 57 mounted on one side of the screw pressure plate 33 constitutes a screw rotating mechanism for rotating the injection screw for measurement with a pulley 58, a pulley 60 and a timing belt 59 wound around the pulleys 58 and 60. This screw rotating mechanism has the same structure as that of the conventional mechanism.

The injection mechanism 3 using the motor having the rotor shaft 54 on which the ball screw is integrally formed, also has effects of omitting the radial bearings, compacting the whole apparatus and eliminating backlashes, like the clamping mechanism 1 and the ejection mechanism 2.

The nozzle touch mechanism 4 comprises the extruder base 36 which serves as an attachment base for a cylinder 35, the injection mechanism 3 and the screw rotating mechanism, a base pressure plate 43 for pushing a pulling plate 36c of the extruder base 36 to move the extruder base 36 in a direction of an injection axis, and a coil spring 61 interposed between the pulling plate 36c and the base pressure plate 43 for absorbing an impact and retaining the pressure. The base pressure plate 43 is slidably attached to the extruder base 36 only in the direction of the injection axis by guide rods (now shown) so that no other linear motion and no rotational motion are allowed, in the same manner as the attachment of the screw pressure plate 33 to the extruder base 36.

To a back surface of the stationary platen 5, an electric motor 63 having a rotor shaft 62 on which a ball screw is integrally formed is fixed. Since a nozzle touch reaction force acts in such a direction that the rotor shaft 62 pulls a motor casing 63a, a thrust bearing for bearing a force acting in such a direction that the rotor shaft 62 pushes the motor casing 63a may be omitted or reduced in size. A ball nut 64 is fixed to the base pressure plate 43 and is threadedly engaged with the ball screw of the rotor shaft 62 projecting through the pulling plate 36c which is fixed to a lower portion of the extruder base 36.

When the electric motor 63 is driven to rotate the ball screw of the rotor shaft 62, the engaged portion of the ball screw with the ball nut 64 varies axially so that the base pressure plate 43 together with the ball nut 64 moves axially along the rotor shaft 62 to move the extruder base 36 forwardly and backwardly, thus performing a nozzle touch action and a sprue break action.

Specifically, when the ball screw of the rotor shaft 62 is rotated to pull the base pressure plate 43 toward the stationary platen 5, the pulling plate 36c of the extruder base 36 is pressed by the base pressure plate 43 via the coil spring 61 so that the extruder base 36 is moved forwardly to bring the distal end of the cylinder 35 into contact with a sprue of the stationary mold. When the base pressure plate 43 is further moved by a predetermined extent to compress the coil spring 61, the nozzle touch force is maintained as it is. When the base pressure plate 43 is moved backwardly, a rear end surface (a right end surface in FIG. 1) is engaged, as being supported from the back side, with a stopper (not shown) projecting from a lower surface of the extruder base 36 so that the extruder base 36 is retracted as pushed backwardly by the base pressure plate 43 via the stopper to perform a sprue break action.

The nozzle touch mechanism 4 using the electric motor 63 having the rotor shaft 62 on which the ball screw is integrally formed, also has effects of omitting the radial bearings, compacting the mechanism and minimizing backlashes, like the clamping mechanism 1, the ejection mechanism 2 and the injection mechanism 3.

Figure 4:
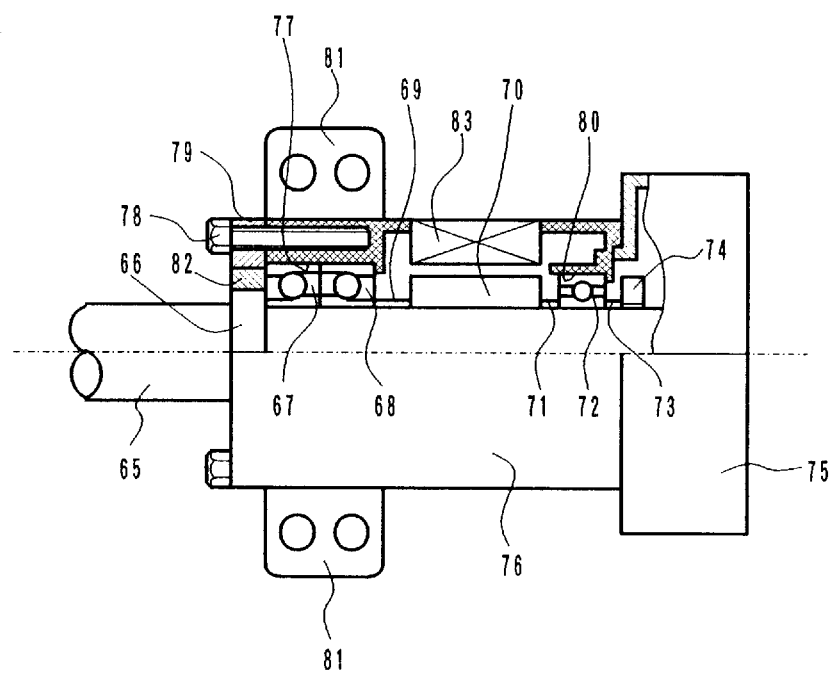
FIG. 4 is a partially sectional plan view of an electric motor to be used in the driving apparatus of the invention.

FIG. 4 is a fragmentary sectional view of an example of an electric motor (servo motor) to be used in each of the foregoing embodiments. In FIG. 4, reference numeral 65 designates a rotor shaft on which a ball screw is integrally formed. The rotor shaft 65 has a larger-diameter portion 66 integrally formed with it, and on a right side of the larger diameter portion 66, there are fitted side by side on the rotor shaft 65 an inner ring of an angular bearing 67 for supporting an axial force acting from the right side, an inner ring of an angular bearing 68 for supporting an axial force acting from the left side, a sleeve-like spacer 69 and a rotor 70. On a right side of the rotor 70, an inner ring of a radial bearing 72 for centering is mounted on the rotor shaft 65 with a sleeve-like spacer 71 interposed therebetween. These elements are tightened between the larger-diameter portion 66 and a nut 74, which is threadedly engaged on the rotor shaft 65, with a spacer 73 interposed therebetween. As occasion demands, a spline or a key fitting may be employed between the rotor shaft 65 and the rotor 70. As shown in FIG. 4, one end of the rotor shaft 65 is connected to a pulse coder 75 fixed to an end surface of a motor casing 76 so that a rotational position of the rotor shaft 65 is detected.

On an inner circumferential surface of the tubular motor casing 76, there is formed a groove 77 into which the outer rings of the angular bearings 67 and 68 are fitted. A flange-like casing head 79 is fixed to the motor casing 76 by a screw bolt 78 for preventing the outer rings of the angular bearings 67 and 68 from slipping on the rotor shaft 65. In this structure, both pushing and pulling forces axially acting on the rotor shaft 65 are borne by the angular bearings 67 and 68, while the radial bearing 72 having an outer ring supported by the groove 80 which is formed at the other end of the motor casing 76 only serves as a centering means for the rotor shaft 65 and hence is not subjected to any substantial radial force. Further, one of the angular bearing 67 bearing an axial force acting in such a direction that the rotor shaft 65 pushes the motor casing 76, and the angular bearing 68 bearing an axial force acting in such a direction that the rotor shaft 65 pulls the motor casing 76, may be omitted or may be reduced in size in view of the force acting on the electric motor. A reference numeral 82 designates a dust seal interposed between the larger-diameter portion 66 of the rotor shaft 65 and the casing head 79 and a reference numeral 83 denotes a stator provided integrally with the motor casing 76.

At opposite sides of a lower portion of the motor casing 76, there are provided attachment flanges 81 each having a through hole through which a fastener such as a screw bolt is to be inserted. The electric motor is mounted on the injection molding machine by means of the attachment flanges 81 and non-illustrated connecting members to be connected to the attachment flanges 81. For example, in order to mount the electric motor so that the rotor shaft 65 stands upright to the attachment surface, one end of an L-shape connecting member is fixed to the individual attachment flange 81 and the other end of the L-shape connecting member is fixed to the attachment surface directly by a screw bolt.

Figure 5:
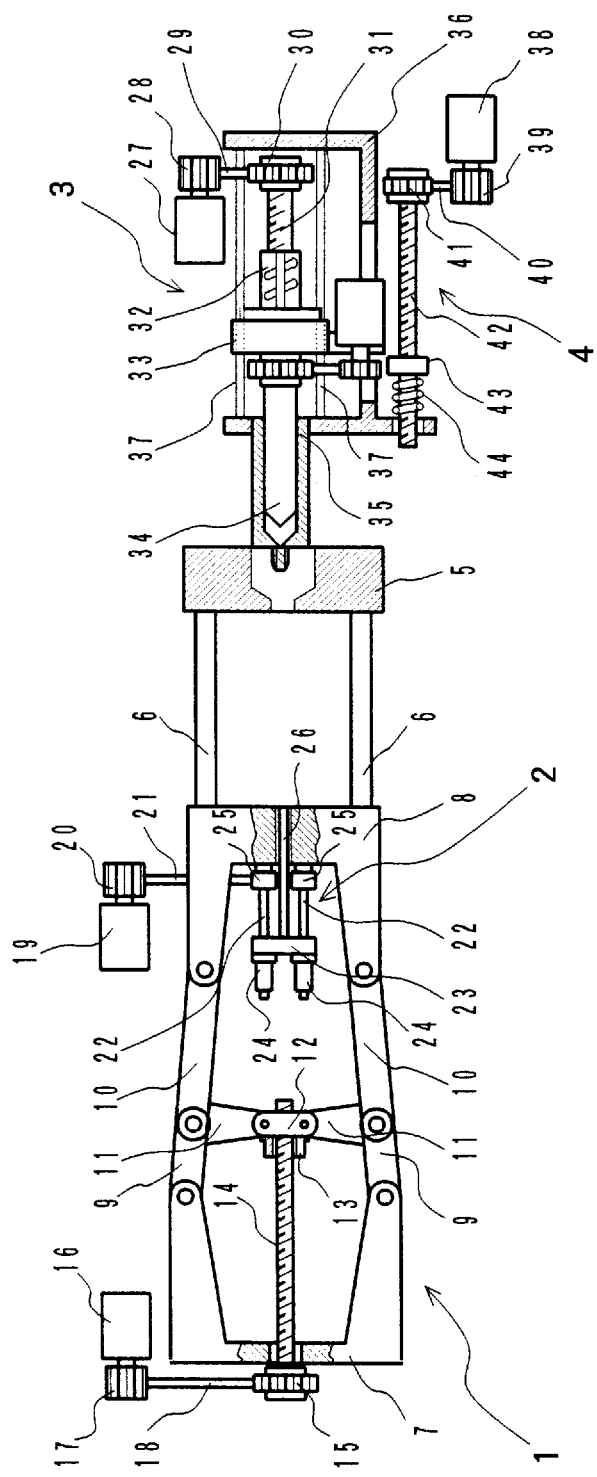
FIG. 5 is a side view of an injection molding machine to be compared with the injection molding machine having the driving apparatus of the invention.

FIG. 5 shows an example of a driving apparatus for an electrically-operated injection molding machine, which is to be compared with the electrically-operated injection molding machine according to the embodiment of the present invention as shown in FIG. 1. In this apparatus, unlike the apparatus of the present invention, a ball screw separate from a rotor shaft of an electric motor is driven by the motor via pulleys and a timing belt. The injection molding machine comprises a clamping mechanism 1, an ejection mechanism 2, an injection mechanism 3 and a nozzle touch mechanism 4.

Various elements, such as a stationary platen 5, tie bars 6, a rear platen 7, a movable platen 8, a ternary link 9, a binary link 10, a cross-head 12 and a cross-head link 11, of the clamping mechanism 1 of FIG. 5 are identical in construction with those of the embodiment as shown in FIG. 1.

A ball nut 13 is fixed to a central portion of the cross-head 12, while a ball screw 14 is rotatably but axially immovably supported by the rear platen 7. In response to rotation of the ball screw 14, the cross-head 12 is linearly moved along an axis of the ball screw 14 so that the individual links 11, 9 and 10 operate to perform a clamping action by the movable platen 8.

A means for rotating the ball screw 14 includes a pulley non-rotatably and axially immovably fixed to one end of the ball screw 14, an electric motor 16 fixed to one side of the rear platen 7, a pulley 17 fixed to the rotor shaft of the motor 16 and a timing belt 18 wound around the pulleys 15 and 17. In order to rotatably and axially immovably support the ball screw 14 on the rear platen 7 against both a radial force acting on the pulley 15 from the timing belt 18 and a clamping reaction force acting on the ball screw 14, it is necessary to provide an angular bearing enough to bear the radial and axial forces between the ball screw 14 and the rear platen 7, which would be a complex construction.

As the electric motor 16 is disposed on a side of the rear platen 7, the width or height of the whole injection molding machine would Increase. Further, as the ball screw 14 Is driven via a plurality of power transmission elements including the pulley 17, the timing belt 18 and the pulley 15, backlashes tend to be accumulated to deteriorate the positioning accuracy. A number of power transmission elements make an inertia of the power transmission system increase to deteriorate the movement responsiveness.

In the ejection mechanism 2, a ball screw 22 rotatably but axially immovably supported by the back surface of the movable platen 8 is rotated by an electric motor 19 mounted on a side of the movable platen 8, via a pulley 20, a timing belt 21 and a pulley 25, to move a knockout bar 23 with a ball nut 24 fixed on it in a straight path so that an ejector rod 26 projects from the movable platen 8. In the injection mechanism 3, a ball screw 31 rotatably but axially immovably supported by an extruder base 36 is rotated by an electric motor 27 which is mounted on a side of the extruder base 36, via a pulley 28, a timing belt 29 and a pulley 30, to move a screw pressure plate 33 with a ball nut 32 fixed on it axially along tie rods 37 of the extruder base 36 so that an injection screw 34 is moved forwardly and backwardly in a cylinder 35. In the nozzle touch mechanism 4, a ball screw 42 rotatably but axially immovably supported by a base of the injection molding machine is rotated by an electric motor 38 which is mounted on the base, via a pulley 39, a timing belt 40 and a pulley 41, to move a base pressure plate 43 which is slidably attached to the extruder base 36 and having a ball nut integrally formed, in a straight path so that the extruder base 36 is moved forwardly and backwardly via a coil spring 44, so as to perform a nozzle touch action of the cylinder 35.

The ejection mechanism 2, the injection mechanism 3 and the nozzle touch mechanism 4 also have the inevitable problems of providing angular bearings in the transmission system, increasing size of the whole mechanism, accumulating backlashes and increasing inertia of the transmission system, similarly to the clamping mechanism 1.

According to the present invention, unlike the conventional driving apparatus in which the ball screw is driven through pulleys and a timing belt, since the ball screw and the rotor shaft are not subjected to any radial force, no bearing is necessary for bearing the radial force exerted on the rotor shaft and the ball screw. Further, as the rotor shaft and the ball screw are integrally formed with each other, any connector for connecting the rotor shaft and the ball screw is not necessary so that simplification of structure and assembly and reduction of number of parts are realized, to provide an electrically-operated injection molding machine at low cost.

Additionally, as the ball screw is directly rotated by the electric motor without using power transmission elements such as pulleys and a timing belt, no backlash accumulates so that an excellent positioning accuracy can be obtained. As the inertia of the power transmission system becomes smaller with the reduction of number of elements constituting the power transmission system, and the ball screw of small diameter (thus small moment of inertia) is driven to transmit power to the ball nut, an excellent responsiveness can be obtained in driving the movable member. Furthermore, as the electric motor for driving the ball screw is disposed on an axis of the ball screw, neither the width nor the height of the injection molding machine is increased by the arrangement of the electric motor to realize an injection molding machine of small size.

What is claimed is:

1. A driving apparatus for axially driving a movable member relative to a stationary member in an electrically-operated injection molding machine, comprising:
   an electric motor having a rotor shaft and mounted on either said movable member or said stationary member;
   a ball screw formed integrally with said rotor shaft of said electric motor; and
   a ball nut threadedly engaged with said ball screw and non-rotatably fixed to said movable member when said electric motor is mounted on said stationary member or to said stationary member when said electric motor is mounted on said movable member;
   wherein said electric motor has a first annular bearing fitted on said rotor shaft for bearing a force exerted on said rotor shaft in one direction of axial directions of said rotor shaft, a second angular bearing disposed next to said first angular bearing for bearing a force exerted on said rotor shaft in the other direction of axial directions of said rotor shaft, a radial bearing, and a rotor disposed between said first and second angular bearings and said radial bearing.

2. A driving apparatus according to claim 1, said injection molding machine including a stationary platen, a movable platen confronting said stationary platen, a rear platen disposed rearward of said movable platen, and a clamping mechanism having a toggle mechanism composed of a plurality of links, wherein said movable member comprises said links of said toggle mechanism and said stationary member comprises said rear platen.

3. A driving apparatus according to claim 1, said injection molding machine includes a clamping mechanism having a movable platen, and an ejection mechanism having a knockout bar non-rotatably and axially movably mounted on said movable platen, wherein said movable member comprises said knockout bar and said stationary member comprises said movable platen.

4. A driving apparatus according to claim 1, said injection molding machine including an extruder base, a screw pressure plate non-rotatably and axially movably mounted on said extruder base, and an injection mechanism having an injection screw rotatably mounted on said screw pressure plate, wherein said movable member comprises said screw pressure plate and said stationary member comprises said extruder base.

5. A driving apparatus according to claim 1, said injection molding machine including a clamping mechanism having a stationary platen, an extruder base, a base pressure plate non-rotatably and axially movably mounted on said extruder base, and a nozzle touch mechanism having a spring interposed between said base pressure plate and said extruder base, wherein said movable member comprises said base pressure plate, said stationary member comprises said stationary platen.

6. An electrically-operated injection molding machine, comprising:

a clamping mechanism;

an ejection mechanism;

an injection mechanism; and a nozzle touch mechanism, wherein said clamping mechanism includes a stationary platen, a rear platen connected to said stationary platen via tie bars, a movable platen slidably supported on said tie bars, a link mechanism connecting the rear platen with the movable platen, a cross-head connected between two sides of the link mechanism, and a motor formed on said cross-head and internal to said rear platen, whereby both width and height of the injection molding machine are reduced by positioning the motor internally to said rear platen.

7. An electrically-operated injection molding machine, comprising:

a clamping mechanism;

an ejection mechanism;

an injection mechanism; and a nozzle touch mechanism, wherein said ejection mechanism includes an ejection unit, a movable platen, guide rods attached to said ejection unit and an internal surface of said movable platen, a motor attached to an internal surface of said ejection unit, and a ball nut fixed to said movable platen, whereby both width and height of the injection molding machine are reduced by positioning the motor internally to said ejection unit.

8. An electrically-operated injection molding machine, comprising:

a clamping mechanism;

an ejection mechanism;

an injection mechanism; and a nozzle touch mechanism, wherein said injection mechanism includes a screw pressure plate, an extruder base, and an electric motor, having a rotor shaft on which a ball screw is integrally formed, disposed on said pressure plate and between said pressure plate and said extruder base, whereby both width and height of the injection molding machine are reduced by positioning the motor between said pressure plate and said extruder base.

9. An electrically-operated injection molding machine, comprising:

a clamping mechanism;

an ejection mechanism;

an injection mechanism; and a nozzle touch mechanism, wherein said nozzle touch mechanism includes an extruder base, the injection mechanism, a base pressure plate pushing a pulling plate of the extruder base, and a coil spring interposed between said pulling plate and said base pressure plate.

* * * * *